No. 701,284. Patented June 3, 1902.
B. W. BOLEN.
NUT LOCK.
(Application filed Aug. 3, 1901.)
(No Model.)

Witnesses
Franck L. Ormand
R. M. Parker.

Inventor
B. W. Bolen
by John S. Duffie Attorney

THE NORRIS PETERS CO., PHOTO-LITHO., WASHINGTON, D. C.

UNITED STATES PATENT OFFICE.

BRANTLE W. BOLEN, OF ROSEBUD, TEXAS.

NUT-LOCK.

SPECIFICATION forming part of Letters Patent No. 701,284, dated June 3, 1902.

Application filed August 3, 1901. Serial No. 70,768. (No model.)

*To all whom it may concern:*

Be it known that I, BRANTLE W. BOLEN, a citizen of the United States, residing at Rosebud, in the county of Falls and State of Texas, have invented certain new and useful Improvements in Nut-Locks, of which the following is a specification.

My invention is primarily intended as a nut-lock used in connection with a vertical bolt by which the forward axle and wheels of a vehicle or the trucks of a railroad-car are connected with the other parts. It may be also used for many other purposes.

Figure 1:
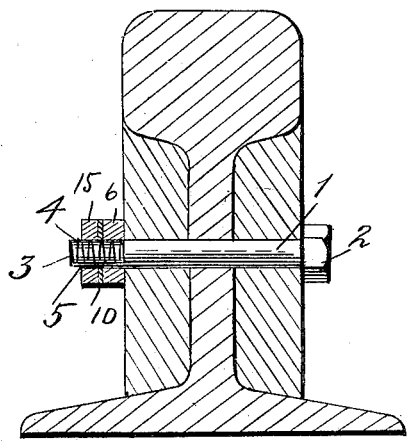
Figure 7:
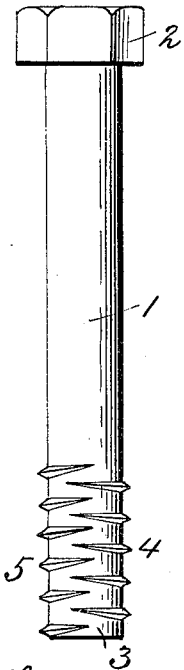
Figure 2:
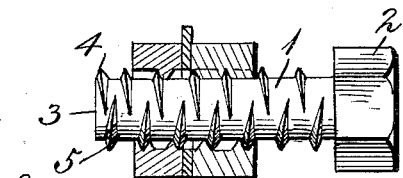
Figure 3:
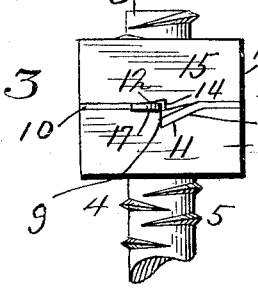
Figure 5:
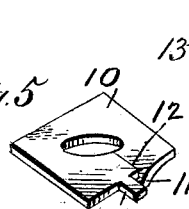
Figure 6:
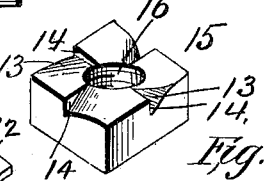
Figure 4:
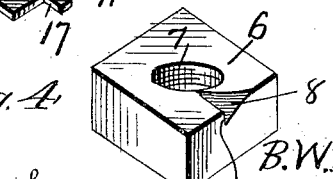

In the accompanying drawings, Figure 1 shows my bolt and nut-lock as used on a railway-rail. Fig. 2 is a view showing the bolt threaded up nearly to its head, so that it may be used to clamp thin pieces of metal together. Fig. 3 is a vertical view of the threaded end of the bolt, showing my nut-locks and washer. Fig. 4 is a perspective view of the inner nut. Fig. 5 is a perspective view of the washer. Fig. 6 is a perspective view of the outer nut. Fig. 7 is a vertical view of the bolt minus the nuts.

My invention is described as follows:

1 represents the bolt; 2, the head; 3, the threaded end. The bolt is made as any other bolt, with a square or octagonal head. The body is preferably cylindrical its entire length, except for a short piece near the head, and running down on the cylindrical part of the body are two threads—a left-hand thread 4 and a right-hand thread 5. The left-hand thread is much broader than the right-hand thread, as shown in Fig. 2, so that neither one of the nuts can jump its proper thread. Screwing down on the right-hand thread is an inner threaded nut 6, having in its opening a right-hand thread 7 and in its upper face a recess 8, slanting in the same direction with its thread, leaving a shoulder 9. After this nut is run on its thread there is let down on the upper face of the nut a spring-washer 10, having two tongues in one edge—a tongue 11, adapted to spring into the recess 8 and abut against the shoulder 9, and a tongue 12, adapted to spring into any one of the recesses 13 and abut against any one of the shoulders 14 of the outer nut 15. This outer nut 15 has running around in its perforated part a left-hand thread 16 and in its lower face has four recesses 13, slanting in an opposite direction from its thread, leaving four shoulders 14, so that it may be locked with the inner nut by a one-fourth turn. The tongue 12, which springs into one of the recesses of the outer nut 15, is provided with a projection 17, so that said tongue may be raised out of any one of the said recesses 13 and away from any one of the shoulders 14 of said outer nut, and thus enable the nut to be unscrewed. These two nuts with the washer may be locked together at any point on the threaded part of the bolt. This is done by turning on the inner nut 6, with its recessed face up, then by slipping over the threaded end of the bolt the washer 10 and letting the tongue 11 drop into the recess 8, and then turn on the outer nut 15, with its recessed face down, turning it to the left until it is tightly against the washer and until the tongue 12 catches firmly against one of the shoulders of said nut, and then the two nuts are locked. To unlock the nuts, spring the tongue 12 downwardly out of one of the recesses 13, and then the nut 15 may be turned to the right and entirely off, if desired, or it may be turned only part of the way off and followed up by the washer and the inner nut and locked again at any point on the threaded part of the bolt.

Having described my invention, what I claim as new, and desire to secure by Letters Patent, is—

The combination of a headed bolt, having a cylindrical body, and running around on said cylindrical body a right-hand thread, and running around on said cylindrical body a left-hand thread, broader than said right-hand thread and crossing the same; an inner nut having a right-hand thread, corresponding with the right-hand thread of the bolt and in its upper face a recess, slanting in the same direction with its thread, leaving a shoulder; a spring-washer provided with a central perforation, and with two tongues in one side, one turning slightly downwardly, and the other slightly upwardly; an upper nut having a left-hand thread corresponding with the left-hand thread of the bolt, and in its lower face one or more recesses, slanting in an opposite direction from its thread, and leaving one or more shoulders; said nuts and washers adapted to be locked and unlocked at any point on the threaded part of the bolt, substantially as shown and described and for the purposes set forth.

In testimony whereof I affix my signature in presence of two witnesses.

B. W. BOLEN.

Witnesses:
 F. S. HAUPT,
 H. CLAY SEARCY.